(12) United States Patent
Kommula et al.

(10) Patent No.: US 11,522,791 B2
(45) Date of Patent: Dec. 6, 2022

(54) DYNAMIC MULTIPATHING USING PROGRAMMABLE DATA PLANE CIRCUITS IN HARDWARE FORWARDING ELEMENTS

(71) Applicant: VMware, Inc., Palo Alto, CA (US)

(72) Inventors: Raja Kommula, Cupertino, CA (US); Constantine Polychronopoulos, Saratoga, CA (US); Thayumanavan Sridhar, Palo Alto, CA (US); Marc-Andre Bordeleau, Shawinigan (CA); Edward Choh, Richmond (CA); Ojas Gupta, Mountain View, CA (US); Robert Kidd, Champaign, IL (US); Georgios Oikonomou, Patras (GR); Jeremy Tidemann, Urbana, IL (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/352,258

(22) Filed: Jun. 19, 2021

(65) Prior Publication Data

US 2021/0314255 A1     Oct. 7, 2021

Related U.S. Application Data

(63) Continuation of application No. 16/550,132, filed on Aug. 23, 2019, now Pat. No. 11,044,193.

(51) Int. Cl.
*H04L 45/24* (2022.01)
*H04L 45/00* (2022.01)

(52) U.S. Cl.
CPC .............. *H04L 45/24* (2013.01); *H04L 45/14* (2013.01); *H04L 45/34* (2013.01)

(58) Field of Classification Search
CPC .......... H04L 45/24; H04L 45/14; H04L 45/34
See application file for complete search history.

(56) References Cited

U.S. PATENT DOCUMENTS

| | | | |
|---|---|---|---|
| 10,200,274 B1 * | 2/2019 | Suryanarayana | ....... H04L 45/02 |
| 11,044,193 B2 | 6/2021 | Kommula et al. | |
| 2019/0245830 A1 * | 8/2019 | Ratnasingham | .... H04L 63/0254 |
| 2021/0058316 A1 * | 2/2021 | Kommula | ............... H04L 45/24 |

* cited by examiner

*Primary Examiner* — Afshawn M Towfighi
(74) *Attorney, Agent, or Firm* — Adeli LLP

(57) ABSTRACT

Some embodiments provide a novel method for adjusting a path for a packet flow from a source machine to a destination machine in a network. The method of some embodiments identifies a condition at a first forwarding element along a first path traversed by the packet flow through the network. The first path traverses through a hardware, second forwarding element before the first forwarding element. In some embodiments, the second forwarding element includes a programmable data plane circuit. The method, in some embodiments, uses an application programming interface (API) of the programmable data plane circuit to provide a set of parameters to the data plane circuit that cause the data plane circuit to forego selecting the first path to forward the packets of the packet flow to the destination machine and instead to select a second path, not traversing the first forwarding element, to the destination machine.

20 Claims, 8 Drawing Sheets

DYNAMIC MULTIPATHING USING PROGRAMMABLE DATA PLANE CIRCUITS IN HARDWARE FORWARDING ELEMENTS

CLAIM OF BENEFIT TO PRIOR APPLICATIONS

The present Application is a continuation application of U.S. patent application Ser. No. 16/550,132, filed Aug. 23, 2019, now published as U.S. Patent Publication 2021/0058316. U.S. patent application Ser. No. 16/550,132, now published as U.S. Patent Publication 2021/0058316, is incorporated herein by reference.

BACKGROUND

Networks in modern data centers use multipath routing extensively, as multipathing is a more efficient way to distribute traffic between any two nodes. When compared to single path routing, multipathing provides better load balancing, improves bandwidth utilization, adds fault tolerance, and mitigates congestion. In addition, in a software defined networking environment, customers can spin up software forwarding nodes (e.g., software-implemented edge gateways) to handle higher traffic demands while leveraging multipathing.

Software defined data centers with equal-cost multi-pathing (ECMP) enabled overlay networks depend on routers in the underlay network doing proper traffic load balancing. However, this combination of performing ECMP in both underlay and overlay networks is not efficient as underlay routers are not aware of the capabilities of overlay routers. Underlay routers treat every overlay ECMP member as equal and distribute traffic equally between them, which may result in poor end-to-end network throughput. Accordingly, a system that improves upon current multipathing solutions would be useful for the modern data center.

BRIEF SUMMARY

Some embodiments provide a novel method for adjusting a path for a packet flow from a source machine to a destination machine in a network. The method of some embodiments is performed by a computer that identifies a condition at a first forwarding element along a first path traversed by the packet flow through the network. Prior to reaching the first forwarding element, the first path traverses through a hardware, second forwarding element, which may include a programmable data plane circuit. The method, in some embodiments, uses an application programming interface (API) of the programmable data plane circuit to provide a set of parameters to the data plane circuit that cause the data plane circuit to forego selecting the first path to forward the packets of the packet flow to the destination machine and instead to select a second path, not traversing the first forwarding element, to forward the packets of the packet flow to the destination machine.

The hardware forwarding element, in some embodiments, is a gateway forwarding element (e.g., a gateway router) of the network and the source of the packet flow is outside the network. In some embodiments, the network is an overlay network and the first forwarding element is an edge forwarding element of the overlay network (e.g., an NSX Edge). In some embodiments, the source and destination machines are both in the network and the hardware forwarding element is not a gateway forwarding element.

In some embodiments, the method is performed by a network controller (e.g., a controller computer executing a management plane and/or control plane application) that collects usage data for a set of forwarding elements including the first forwarding element, while in other embodiments the method is performed by a compute controller/manager. In some embodiments, the controller is a load monitor computer (which may be integrated with the network or compute controller, or operating separately) that collects usage data from at least one of (1) the controller computers and (2) the forwarding elements.

The usage data, in some embodiments, is used as a measure of congestion of at least the first forwarding element and forms the basis for a set of parameters generated by the computer that is provided to the data plane circuit through the API. In some embodiments, the first forwarding element is a software forwarding element (e.g., a managed software forwarding element that is configured by the network controller) that executes on a host computer along with other compute machines on a shared set of resources and the usage data includes data relating to the use of the shared resources of the host machine as well as the resources allocated to the software forwarding element. In other embodiments, the first forwarding element is a standalone forwarding element (e.g., a software forwarding element executing on a dedicated host computer) and the usage data relates to the use of the resources of the first forwarding element.

In some embodiments, the usage data includes data relating to each of the forwarding elements that is a next hop from the hardware forwarding element along different possible paths to the destination machine. The usage data, in some embodiments, includes data relating to any, or all, of: (1) forwarding element characteristics, (2) network interface controller (NIC) characteristics, and (3) characteristics of a host computer hosting a forwarding element. Forwarding element characteristics, in some embodiments, include one or more of the number of virtual central processing units (vCPUs) and the number of layer 2 hops between the programmable data plane circuit and the forwarding element. NIC characteristics, in some embodiments, include at least one of NIC speed and NIC utilization. In some embodiments, the host machine characteristics include any, or all, of: (1) the number of CPUs on the host computer, (2) the speed of the CPUs, (3) a utilization value for the CPUs, and (4) a memory utilization value.

Additional data, in some embodiments, is collected relating to upcoming events. In some embodiments, the upcoming events are scheduled with the controller computer such as an upgrade to a particular forwarding element on a path to the destination machine. The upcoming event, in some embodiments, is a based on a request to add (e.g., instantiate) or remove a forwarding element from a group of forwarding elements that can be used to reach the destination. In some embodiments, the usage data and data relating to upcoming events is collected periodically (e.g., every ten seconds, every thirty seconds, etc.) so that the set of parameters provided to the hardware forwarding element reflect the current state of the network.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for adjusting a path for a packet flow from a source machine to a destination machine in a network. The method of some embodiments is performed by a computer that identifies a condition at a first forwarding element along a first path traversed by the packet flow through the network. Prior to reaching the first forwarding element, the first path traverses through a hardware, second forwarding element, which may include a programmable data plane circuit. The method, in some embodiments, uses an application programming interface (API) of the programmable data plane circuit to provide a set of parameters to the data plane circuit that cause the data plane circuit to forego selecting the first path to forward the packets of the packet flow to the destination machine and instead to select a second path, not traversing the first forwarding element, to forward the packets of the packet flow to the destination machine.

As used in this document, data messages, or packets, refer to a collection of bits in a particular format sent across a network. Also, as used in this document, a data flow, or packet flow, refers to a set of data messages, or packets, sharing a set of attributes (e.g. a five-tuple). One of ordinary skill in the art will recognize that the term data message, or packet, may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

Figure 1:
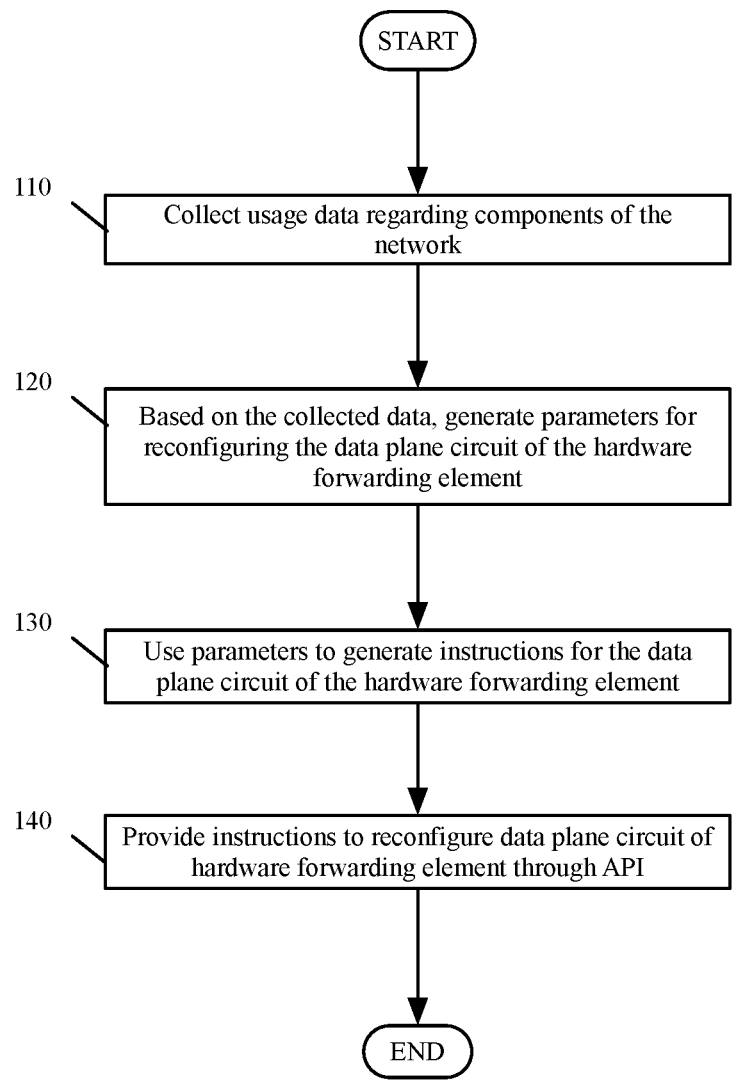
FIG. 1 conceptually illustrates a process for adjusting a path for a packet flow from a source machine to a destination machine in a network based on usage data.

FIG. 1 conceptually illustrates a process 100 for adjusting a path for a packet flow from a source machine to a destination machine in a network. Process 100 is performed, in some embodiments, by one of: (1) a controller computer (e.g., a management plane or control plane application or computer), (2) a compute manager, and (3) a load monitor computer. Process 100 begins by collecting (at 110) usage data regarding components of the network (e.g., forwarding elements, host computers, etc.). The usage data, in some embodiments, is collected by querying the forwarding elements. Alternatively, or additionally, host computers hosting the forwarding elements are queried in some embodiments. In other embodiments, a load monitor computer queries one or more controllers of the network for usage data regarding the forwarding elements and host computers in the network that the controller maintains. One of ordinary skill in the art will appreciate that reports from the forwarding elements or controllers are used in place of, or in addition to, the queries discussed above.

In some embodiments, the usage data includes data relating to each of the forwarding elements that is a next hop from the hardware forwarding element to the destination machine. The usage data, in some embodiments, includes data relating to any, or all, of: (1) forwarding element characteristics, (2) network interface controller (NIC) characteristics, and (3) characteristics of a host computer hosting a forwarding element. Forwarding element characteristics, in some embodiments, include any, or all, of: (1) the number of virtual central processing units (vCPUs), (2) memory of the forwarding element, (3) a speed of the forwarding element, and (4) the number of layer 2 hops between the programmable data plane circuit and the forwarding element. NIC characteristics, in some embodiments, include at least one of the NIC speed and the NIC utilization. In some embodiments, the host machine characteristics include any, or all, of: (1) the number of CPUs on the host computer, (2) the speed of the CPUs, (3) a utilization value for the CPUs, and (4) a memory utilization value. One of ordinary skill in the art will appreciate that additional usage data that affects forwarding operations will be collected in various different embodiments. In some embodiments, the usage data is collected periodically (e.g., every ten seconds) so that the set of parameters provided to the hardware forwarding element reflect the current state of the network.

After usage data has been collected (at 110), the usage data is used to generate (at 120) a set of parameters for reconfiguring a programmable data plane circuit of the hardware forwarding element. In some embodiments, the parameters are a set of weights that are used in distributing packets of a packet flow to different forwarding elements that are along different paths to a destination of the packet flow. Weight calculations, in some embodiments, are based on a capacity of the forwarding element calculated indicated by the usage data. For example, for each characteristic for which usage data is collected, an available capacity percentage value ("$C_i$(characteristic)") is calculated for each forwarding element based on the total capacity of the forwarding element and the available capacity of the forwarding element. The $C_i$ for each forwarding element is then used to calculate a constraint weight ("$\phi_i$(characteristic)") for the characteristic for each forwarding element. The constraint weight, $\phi_i$, in some embodiments, is a normalized weight based on all the $C_i$ values for the different forwarding elements (e.g., for "N" forwarding elements) for that characteristic (e.g., $\phi_i = 100 * C_i / \Sigma_{i=1}^{N} C_i$). A weight value ("$W_i$") for each forwarding element is then calculated based on the constraint weights for each of a number (e.g., "M") of characteristics (e.g., according to the equation $W_i = \Sigma_{i=1}^{M} \phi_i / M$). In some embodiments, instead of indicating weights of each of a set of next-hop forwarding elements, the parameters identify possible next-hop forwarding elements. One of ordinary skill in the art will appreciate that there are many ways to calculate weights or other parameters to provide to the programmable data plane.

After the set of parameters is generated (at 120), a set of instructions for programming the hardware forwarding element (or the programmable data plane circuit of the hardware forwarding element) is generated (at 130) using the set of parameters. The set of instructions is based on the generated parameters and is generated to communicate the generated parameters to the programmable data plane circuit of the hardware forwarding element. In some embodiments, the set of instructions is generated for an application programming interface (API) of the hardware forwarding element. The set of instructions, in some embodiments, is written in a programming language (e.g., P4) that is understood by the API of the programmable data plane circuit.

Once the set of instructions for programming the hardware forwarding element is generated (at 130), the set of instructions is provided (at 140) to the hardware forwarding element to program the programmable data plane circuit. The set of instructions provided to the hardware forwarding element, in some embodiments, is provided through an API of the programmable data plane circuit. The set of instructions include the parameters determined (at 120) based on the collected usage data. In some embodiments, the parameters cause the data plane circuit to change the way that the data plane circuit forwards packets of a packet flow to a destination machine. For example, a first forwarding element that was previously used to forward packets for the packet flow is, in some embodiments, used less or not at all (in favor of a second forwarding element) after a set of parameters is provided through the API. After providing (at 140) the set of instructions to the programmable data plane circuit of the hardware forwarding element, the process 100 ends.

Figure 2:
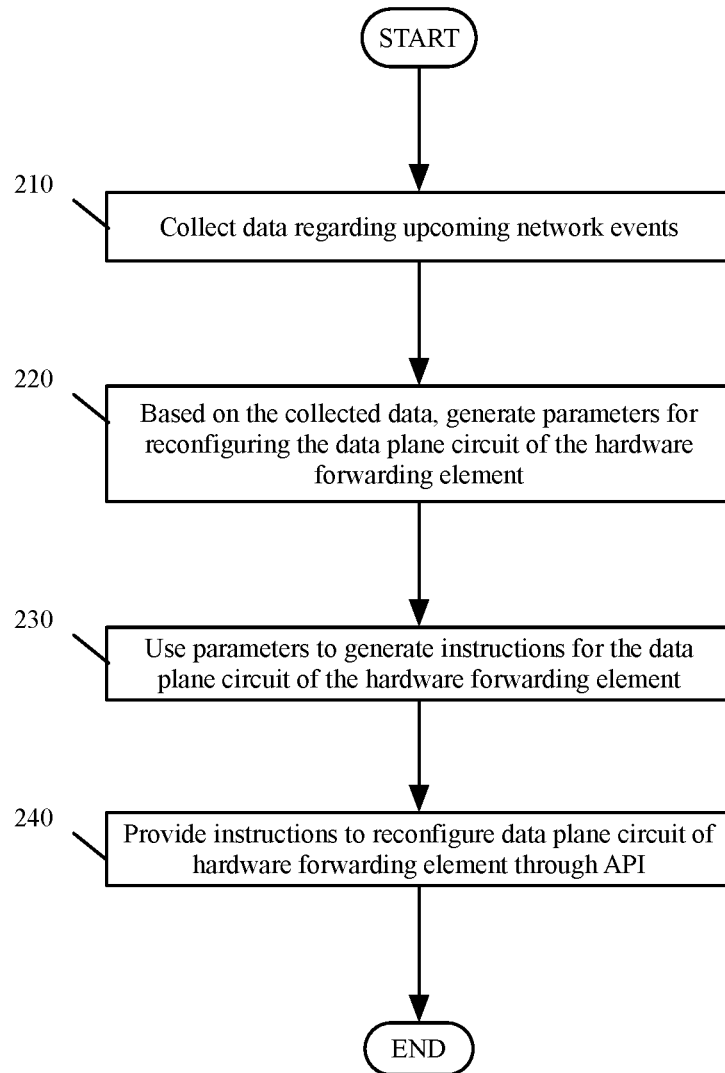
FIG. 2 conceptually illustrates a process for adjusting a path for a packet flow from a source machine to a destination machine in a network based on upcoming events.

The description above describes the situation in which the controller reconfigures the hardware forwarding elements based on usage data (e.g., usage statistics) collected from forwarding elements and/or host computers. One of ordinary skill in the art will realize that this is not the only type of event that can cause controllers to reconfigure the hardware forwarding elements. In other embodiments, the controllers reconfigure the hardware forwarding elements not in view of past and current events and data, but based on future events such as a scheduled upgrade or shutting down of a host computer. FIG. 2 conceptually illustrates such a process 200. This process is identical to process 100 but for the initial operation. That is, process 200 begins (at 210) by collecting data regarding upcoming network events. In some embodiments, the upcoming events are scheduled with the controller computer such as an upgrade to a particular forwarding element on a path to the destination machine. The upcoming event, in some embodiments, is based on a request to add (e.g., instantiate) or remove a forwarding element from a group of forwarding elements that can be used to reach the destination. In some embodiments, data regarding upcoming network events is collected from the network controller computers (e.g., management plane and/or control plane computers) and/or compute controller computers.

Generating (at 220) the parameters for reconfiguring the data plane circuit is largely the same as generating the corresponding parameters in process 100. However, in some embodiments, rather than generating adjustments to weights, the newly generated parameters account for removal from the possible next hops of a forwarding element that has failed or is scheduled for shut down (or that executes on a host computer that has failed or is scheduled for shut down). Specifically, in some embodiments, the weight parameter for such a next-hop (i.e., that has failed or is scheduled to be shut down) is set to 0. One of ordinary skill in the art will appreciate that processes 100 and 200, in some embodiments, are combined into a single process with both the usage data and the network events being used to generate the set of parameters that are used for generating and providing instructions to reconfigure the data plane circuit of the hardware forwarding element.

Figure 3A:
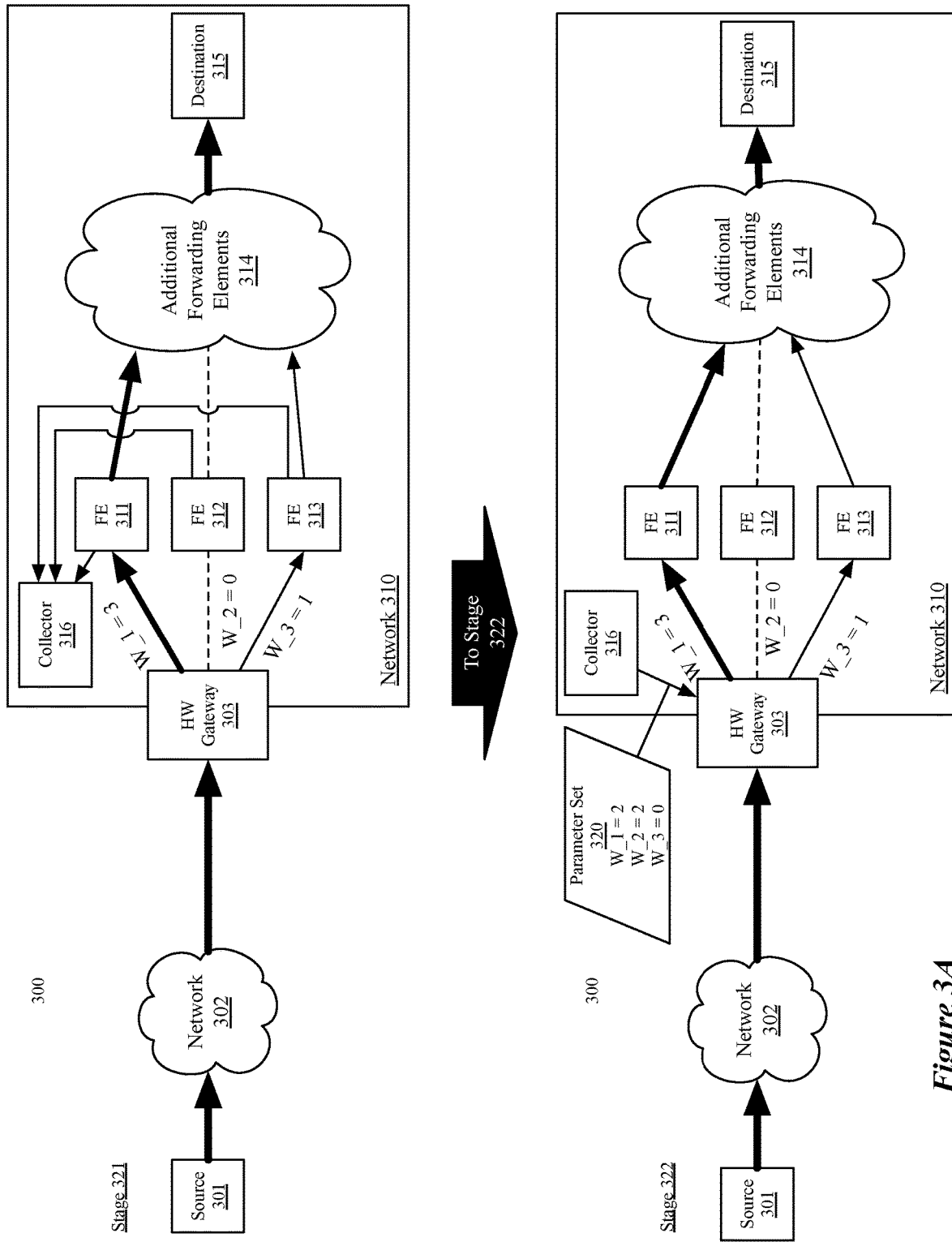
FIGS. 3A-B illustrate a system that includes a hardware gateway forwarding element that has a set of parameters (e.g., weights) provided to adjust its distribution of packets in a packet flow between a source machine and a destination machine.
Figure 3B:
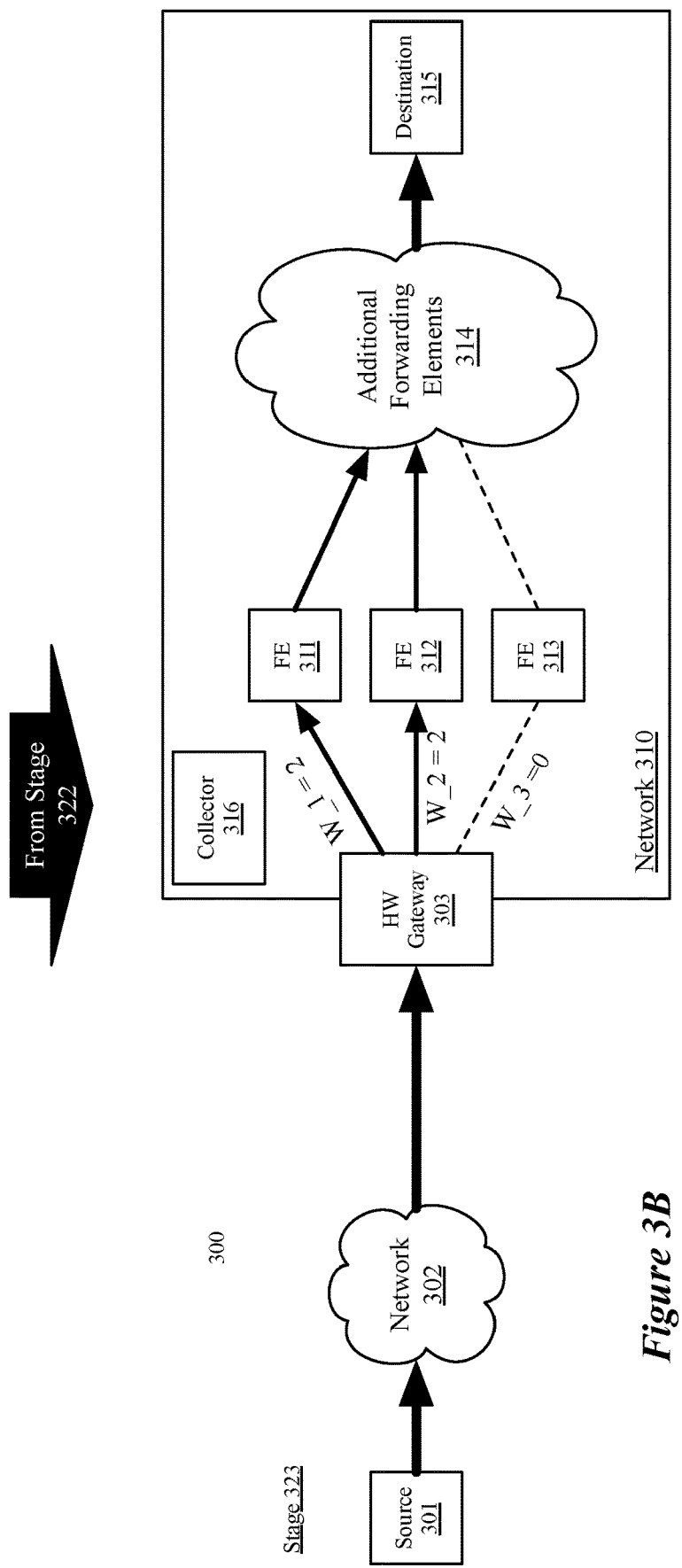

The hardware forwarding element, in some embodiments, is a gateway forwarding element of the network and the source of the packet flow is outside the network. FIGS. 3A-B illustrate, over three stages 321-323 a system 300 that includes a hardware gateway forwarding element 303 that has a set of parameters (e.g., weights) provided to adjust its distribution of packets in a packet flow between a source machine 301 and a destination machine 315. The system 300, in the illustrated embodiments, includes a source machine 301, an intervening network 302, a hardware forwarding element 303 at the edge of a network 310, a set of forwarding elements 311-313, a set of additional forwarding elements 314, a controller 316, and a destination machine 315 that connects to the set of forwarding elements 311-313 through the set of additional forwarding elements 314.

In the illustrated embodiment, the source machine 301 is external to the network 310 and communicates with the destination machine 315 through an external network 302 and the hardware gateway forwarding element 303. The network 310, in some embodiments, is a data center, and, in some embodiments, the data center includes at least one overlay logical network implemented by a set of forwarding elements (e.g., the forwarding elements 311-313). In some embodiments, the forwarding elements 311-313 are managed forwarding elements (MFEs) acting as gateway forwarding elements for an overlay logical network including the destination machine 315. In some embodiments, the forwarding elements 311-313 are next hops for a set of paths to the destination machine 315.

In some embodiments, the forwarding elements 311-313 are software forwarding elements (or managed forwarding elements) that execute on a set of host computers (not shown) along with other compute machines on a shared set of resources of the host computer and the usage data includes data relating to the use of the shared resources of the host machine as well as the resources allocated to the software forwarding element. The forwarding elements 311-313, in some embodiments, are standalone forwarding elements (e.g., a software forwarding element executing on a dedicated host computer) and the usage data relates to the use of the resources of the first forwarding element. In some embodiments, the forwarding elements 311-313 include standalone forwarding elements and software forwarding elements executing on host computers.

As shown in the first stage 321, the hardware gateway forwarding element 303 begins with a first set of weights (i.e., {W_1, W_2, W_3}={3,0,1} for forwarding elements 311, 312, and 313 respectively) that is used to distribute packets of the packet flow between the source machine 301 and the destination machine 315 among different paths to the destination through the different forwarding elements 311-313. The different paths through the destination, in some embodiments, traverse the set of additional forwarding elements 314 in the network 310. In some embodiments, the set of forwarding elements 311-313 performs a set of middlebox services (e.g., firewall, network address translation, etc.) that are required along a path from the source machine 301 to the destination machine 315.

The initial set of weights in stage 321 of FIG. 3A indicates that no packets are to be distributed to the second forwarding element 312 while the first forwarding element 311 receives approximately 3 times as many packets as the third forwarding element 313. In some embodiments, the different weights are based on the different capacities (e.g., total capacity, available capacity, etc.) of the different forwarding elements. The different capacities are defined, in some embodiments, by the usage data collected by collector 316. In the first stage 321, the forwarding element 312 has a weight of "0" because, e.g., it had not been included in the previous parameter set (e.g., it had been initialized ["spun up"] after the previous parameter set had been generated, it had failed, it had no capacity for processing packets, had a scheduled downtime for updates or maintenance, etc.). The weights associated with the other forwarding elements 311 and 313, are, in some embodiments, based on previously collected usage data that indicated that the first forwarding element 311 had three times the capacity for processing packets as did the third forwarding element 313.

The collector 316, in the illustrated embodiment, collects usage data from each of the forwarding elements 311-313 in order to generate a parameter set for programming a programmable data plane circuit of the hardware gateway forwarding element 303. In the illustrated embodiment, the controller 316 performs the collection of data from the forwarding elements 311-313 directly, however, in other embodiments, the usage data is collected from another element of the network 310 that interacts directly with the forwarding elements 311-313 and provides the collected usage data to the collector 316. As discussed above, the usage data, in some embodiments includes data relating to any, or all, of: (1) forwarding element characteristics, (2) network interface controller (MC) characteristics, and (3) characteristics of a host computer (not shown) hosting a forwarding element. The collector 316 in the illustrated embodiment collects the usage data and generates a parameter set (and set of instructions) for providing to the programmable data plane circuit of the hardware gateway forwarding element 303.

The second stage 322 illustrates the parameter set being provided to the programmable data plane circuit of the hardware gateway forwarding element 303, to be used to update the distribution of the packets of the packet flow from the source machine 301 to the destination machine 315. One of ordinary skill in the art will appreciate that other parameter sets besides weights may be provided in some embodiments. For example, a parameter set, in some embodiments, indicates which forwarding elements are viable next hops (e.g., generally, or for specific destination addresses).

In the third stage 323 illustrates the hardware gateway forwarding element 303 using the provided parameter set (e.g., set of weights) 320 to distribute packets of the packet flow differently than they were distributed previous to receiving the parameter set 320. In the illustrated embodiment, the updated parameter set (i.e., {2, 2, 0}) has effectively removed the forwarding element 313 from the set of available next hops for the packet flow and has assigned equal weights to the two remaining forwarding elements 311 and 312. In some cases, the equal weights are assigned based on the usage data indicating that the two forwarding elements have approximately equivalent capacities (e.g., total capacity, available capacity, etc.). The assignment of a "0" weight to the third forwarding element 313, in some embodiments can be for any of multiple reasons (e.g., it had failed, it had no capacity for processing packets, had a scheduled downtime for updates or maintenance, etc.) as discussed above in relation to the second forwarding element 312.

Figure 4:
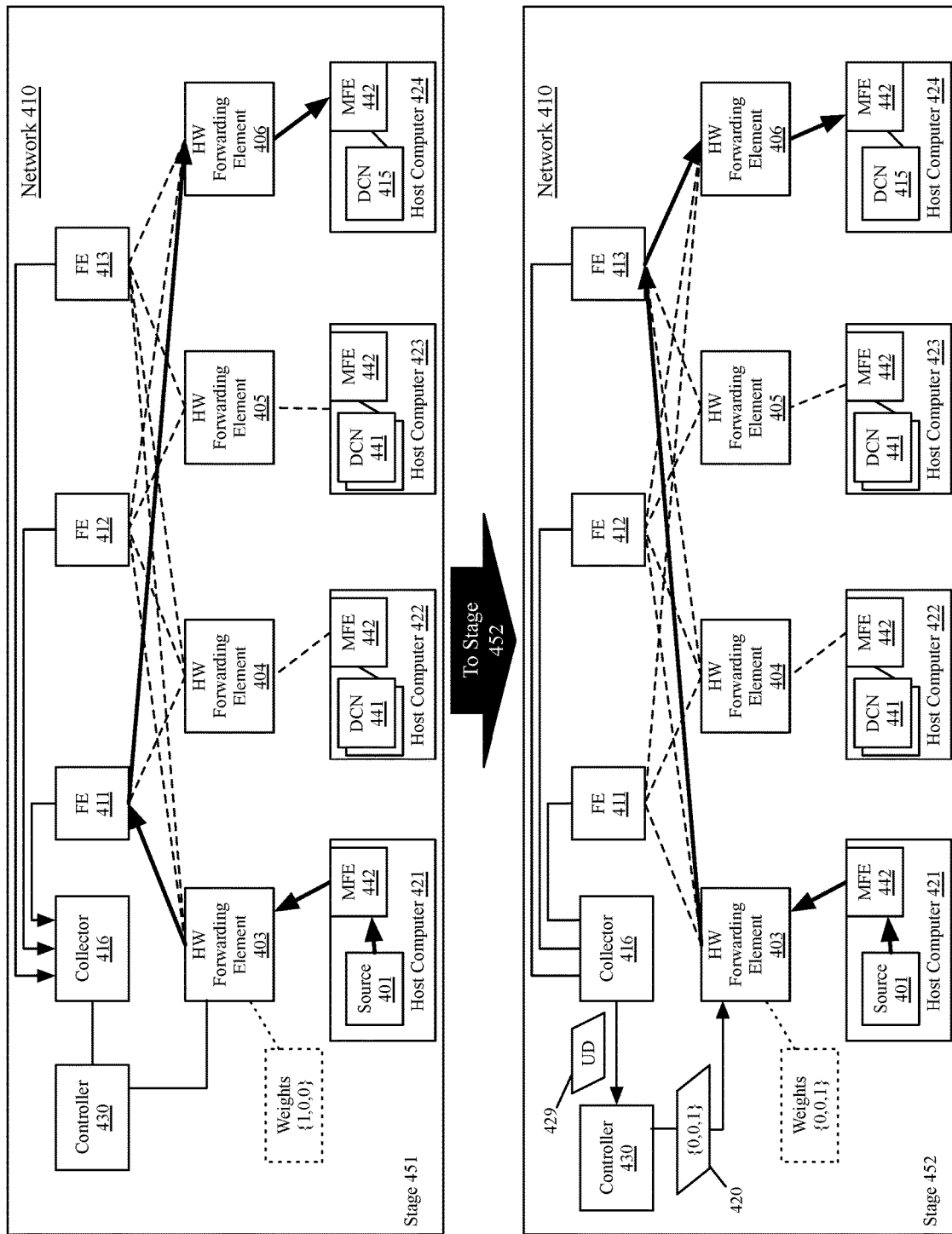
FIG. 4 illustrates a network that includes a hardware forwarding element that has a set of parameters (e.g., weights) provided to adjust its distribution of packets in a packet flow between a source machine and a destination machine.

In other embodiments, the hardware forwarding element being configured by the controller with different weight parameters is not a gateway forwarding element, and both the source and the destination of the packet flow are inside the network. FIG. 4 illustrates, over two stages 451-452, a network 410 that includes a hardware forwarding element 403 that has a set of parameters (e.g., weights) provided to adjust its distribution of packets in a packet flow between a source machine 401 and a destination data compute node (DCN) 415. The network 410, in the illustrated embodiments, includes a source machine 401, a set of leaf forwarding elements 403-406 (shown as hardware forwarding elements but, in some embodiments, may also include software forwarding elements) in a leaf-spine architecture, a set of spine forwarding elements 411-413 in the leaf-spine architecture, a controller 416, additional DCNs 441 (e.g. machines providing virtual functions for 5G processing, and additional host computers 421-424. As shown, the source machine 401 and the destination DCN 415 execute on host computers 421 and 424 respectively. Each host computer 421-424 executes a managed forwarding element (MFE) 442. In some embodiments, the managed forwarding elements 442 implement a logical overlay network to which the source machine 401 and the destination DCN 415 belong (with the leaf and spine forwarding elements being part of the underlay network). In some embodiments, any or all of the host computers 421-424 also host a set of additional machines (e.g., data compute nodes [DCNs] 441) and forwarding elements (e.g., managed forwarding elements [MFEs] 442).

In the illustrated embodiment, the source machine 401 is internal to the network 410 and communicates with the destination DCN 415 through a leaf-spine architecture within network 410 passing through the hardware forwarding element 403. The network 410, in some embodiments, is a data center, and, in some embodiments, the data center includes at least one overlay logical network implemented by a set of forwarding elements (e.g., the forwarding elements 411-413 and MFEs 442). In some embodiments, the forwarding elements 411-413 are managed forwarding elements (MFEs) acting as logical routers (e.g., service routers) for an overlay logical network including at least one of the source machine 401 and the destination DCN 415. As shown in the first stage 451, the hardware forwarding element 403 begins with a first set of weights (i.e., {1,0,0} for forwarding elements 411, 412, and 413 respectively) that is used to distribute packets of the packet flow between the source machine 401 and the destination machine 415 among different paths to the destination through the different forwarding elements 411-413. In some embodiments, the set of forwarding elements 411-413 performs a set of middlebox services (e.g., firewall, network address translation, etc.) that are required along a path from the source machine 401 to the destination DCN 415.

The initial set of weights in the first stage 451 (i.e., {1,0,0}) indicates that packets are distributed to the forwarding element 411 exclusively. This initial weight, in some embodiments, is based on a determination that the forwarding elements 412 and 413 had no capacity for additional traffic. The set of parameters received from a controller such as the controller 430, in such embodiments, causes the programmable data plane circuit of hardware forwarding element 403 to perform dynamic weighted cost multipathing (DWCMP). The collector 416 receives usage data from each of the forwarding elements 411-413, in some embodiments, and generates a set of usage data based on the collected usage data. In some embodiments, the collector 416 generates a summarized set of usage data, while in other embodiments, the usage data is merely a concatenation of all received usage data. As discussed above, the usage data, in some embodiments includes data relating to any, or all, of: (1) forwarding element characteristics, (2) network interface controller (MC) characteristics, and (3) characteristics of a host computer (not shown) hosting a forwarding element.

The collector 416 in the illustrated embodiment collects the usage data but does not determine a parameter set to provide to a programmable data plane circuit of the hardware forwarding element 403. In some embodiments, the collector 416 is a module in a controller computer (or network manager or compute manager) that maintains information regarding the elements of network 410. The collector 416, in some embodiments, is implemented as a cluster of collectors. In some embodiments, the controller computer 430 implements at least one overlay network using the elements of the network 410 and the collected usage data is collected in the process of implementing the overlay network.

The second stage 452 illustrates the controller 430 providing a set of parameters 420 (i.e., {0,0,1}) to the hardware forwarding element 403 (or the programmable data plane circuit of the hardware forwarding element 403). The set of parameters generated by the controller 430, in some embodiments, is provided to the data plane circuit through an API of the programmable data plane circuit. In the second stage 452, the set of parameters 420 is based on the usage data 429 received from the collector 416, in some embodiments. The set of parameters 420, in the illustrated embodiment, is generated by the controller 430. In some embodiments, the controller 430 is a dedicated load monitor computer that is configured to collect usage data (and data regarding upcoming network events), generate the parameter set, and provide instructions to the programmable data plane circuit. In some embodiments, the different weights are based on the different capacities (e.g., total capacity, available capacity, etc.) of the different forwarding elements. The different capacities are defined, in some embodiments, by the usage data and data regarding upcoming network events collected by collector 416 in the first stage 451.

The second stage 452 illustrates the parameter set 420 being provided to the programmable data plane circuit of the hardware forwarding element 403 to be used to update the distribution of the packets of the packet flow from the source machine 401 to the destination DCN 415. The updated set of weights for the distribution is indicated in the dashed-line box labeled weights. One of ordinary skill in the art will appreciate that other parameter sets besides weights may be provided in some embodiments. For example, a parameter set, in some embodiments, indicates which forwarding elements are viable next hops (e.g., generally or for specific destination addresses).

The second stage 452 also illustrates the hardware forwarding element 403 using the provided parameter set (e.g., set of weights) 420 to distribute packets of the packet flow differently than they were distributed before receiving the parameter set 420. In the illustrated embodiment, the updated parameter set (i.e., {0,0,1}) has effectively removed the forwarding element 411 from the set of available next hops for the packet flow and has instead replaced it with forwarding element 413. In some cases, the new weights are assigned based on the usage data 429 indicating that the two forwarding elements have different capacities (e.g., total capacity, available capacity, etc.). The assignment of a "0" weight to the second forwarding elements 411 and 412, in some embodiments can be for any of multiple reasons (e.g., it had failed, it had no capacity for processing packets, had a scheduled downtime for updates or maintenance, is being taken offline, etc.).

Figure 5:
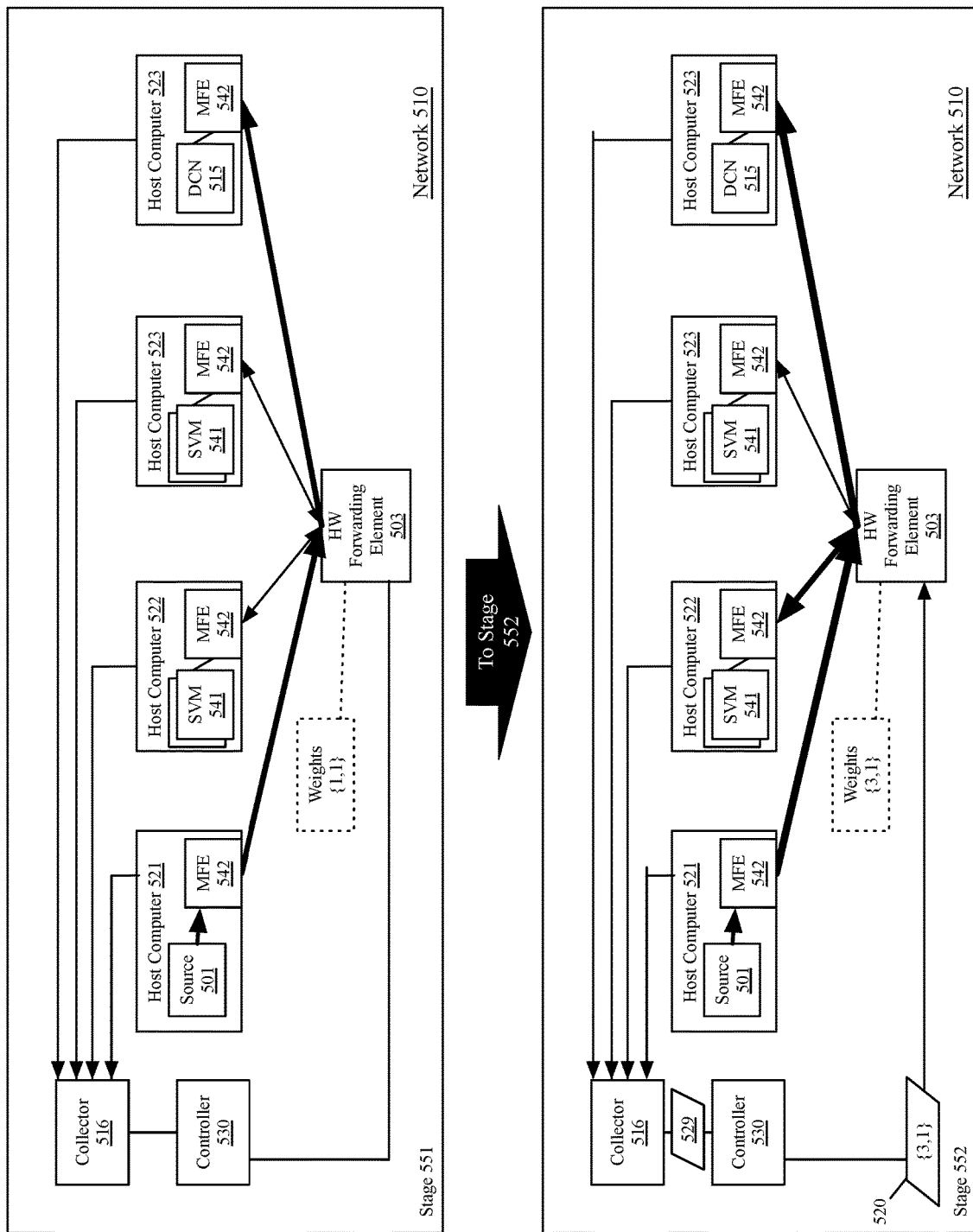
FIG. 5 illustrates a network that includes a hardware forwarding element that has a set of parameters (e.g., weights) provided to adjust its distribution of packets in a packet flow between a source machine and a destination machine.

FIG. 5 illustrates, over two stages 551-552 a network 510 that includes a hardware forwarding element 503 that has a set of parameters (e.g., weights) provided to adjust its distribution of packets in a packet flow between a source machine 501 and a destination DCN 515. The network 510, in the illustrated embodiments, includes a source machine 501, a forwarding element 503, a controller 516, a destination DCN 515, and additional host computers 521-524. As shown, the source machine 501, the destination DCN 515, and a set of service virtual machines (SVMs) 541 execute on host computers 521-524. Each host computer 521-524 executes a managed forwarding element (MFE) 542. In some embodiments, the managed forwarding elements 542 implement a logical overlay network to which the source machine 501 and the destination DCN 515 belong. In some embodiments, any or all of the host computers 521-524 also host a set of additional machines (e.g., data compute nodes [DCNs]) and forwarding elements (e.g., managed forwarding elements [MFEs] 542). In some embodiments, the SVMs 541 provide a service on a path from the source 501 to the destination 515 and must therefore be traversed to reach the destination 515.

The first stage 551 illustrates a that the host computers 521-524 and the forwarding element 503 are in a fully meshed configuration. The network 510, in some embodiments, is a data center, and, in some embodiments, the data center includes at least one overlay logical network implemented by a set of forwarding elements (e.g., the MFEs 542). As shown in the first stage 551, the hardware forwarding element 503 begins with a first set of weights (i.e., {1,1} for MFEs executing on host computers 522 and 523 respectively) that is used to distribute packets of the packet flow between the source machine 501 and the destination DCN 515 among different paths to the destination through the different host computers 522 and 523. In some embodiments, the set of SVMs 541 performs a set of middlebox services (e.g., firewall, network address translation, etc.) or virtualized network functions for a 5G communication that are required along a path from the source machine 501 to the destination DCN 515.

The initial set of weights in stage 551 (i.e., {1,1}) indicates that packets are distributed to each of the host computers 522 and 523 equally. For an embodiment in which the hardware forwarding element 503 uses equal cost multipathing (ECMP) to distribute packets of the packet flow, this initial weight is based on a standard ECMP distribution algorithm that distributes packets evenly across all equal cost paths to a destination without regard for the capacity of the forwarding elements of the different paths. This initial set of weights is, in some embodiments, a default configuration of the programmable data plane circuit of hardware forwarding element 503 that is configured to perform ECMP. The set of parameters received from a controller such as the controller 530, in such embodiments, causes the programmable data plane circuit of hardware forwarding element 503 to perform dynamic weighted cost multipathing (DWCMP). The collector 516 receives usage data from each of the host computers 521-524, in some embodiments, and generates a set of usage data based on the collected usage data. In some embodiments, the collector 516 generates a summarized set of usage data, while in other embodiments, the usage data is merely a concatenation of all received usage data. As discussed above, the usage data, in some embodiments includes data relating to any, or all, of: (1) forwarding element characteristics, (2) network interface controller (MC) characteristics, and (3) characteristics of a host computer hosting a forwarding element.

The collector 516 in the illustrated embodiment collects the usage data but does not determine a parameter set to provide to a programmable data plane circuit of the hardware forwarding element 503. In some embodiments, the collector 516 is a module in a controller computer (or network manager or compute manager) that maintains information regarding the elements of network 510. The collector 516, in some embodiments, is implemented as a cluster of collectors. In some embodiments, the controller computer 516 implements at least one overlay network using the elements of the network 510 and the collected usage data is collected in the process of implementing the overlay network.

The second stage 552 illustrates the controller 530 providing a set of parameters 520 (i.e., {3,1}) to the hardware forwarding element 503 (or the programmable data plane circuit of the hardware forwarding element 503). The set of parameters generated by the controller 530, in some embodiments, is provided to the data plane circuit through an API of the programmable data plane circuit. In stage 552 of FIG. 5, the set of parameters 520 is based on the usage data 529 received from the collector 516, in some embodiments. The set of parameters 520, in the illustrated embodiment, is generated by the controller 530. In some embodiments, the controller 530 is a dedicated load monitor computer that is configured to collect usage data (and data regarding upcoming network events), generate the parameter set, and provide instructions to the programmable data plane circuit. In some embodiments, the different weights are based on the different capacities (e.g., total capacity, available capacity, etc.) of the different forwarding elements. The different capacities are defined, in some embodiments, by the usage data collected by collector 516 in the first stage 551.

The second stage 552 illustrates the parameter set 520 being provided to the programmable data plane circuit of the hardware forwarding element 503 to be used to update the distribution of the packets of the packet flow from the source machine 501 to the destination DCN 515. The updated set of weights for the distribution is indicated in the dashed-line box labeled weights. One of ordinary skill in the art will appreciate that other parameter sets besides weights may be provided in some embodiments. For example, a parameter set, in some embodiments, indicates which forwarding elements are viable next hops (e.g., generally or for specific destination addresses).

The second stage 552 also illustrates the hardware forwarding element 503 using the provided parameter set (e.g., set of weights) 520 to distribute packets of the packet flow differently than they were distributed before receiving the parameter set 520. In the illustrated embodiment, the updated parameter set (i.e., {3,1}) has assigned new weights to the two host computers 522 and 523. In some cases, the new weights are assigned based on the usage data 529 indicating that the two forwarding elements have different capacities (e.g., total capacity, available capacity, etc.).

Figure 6:
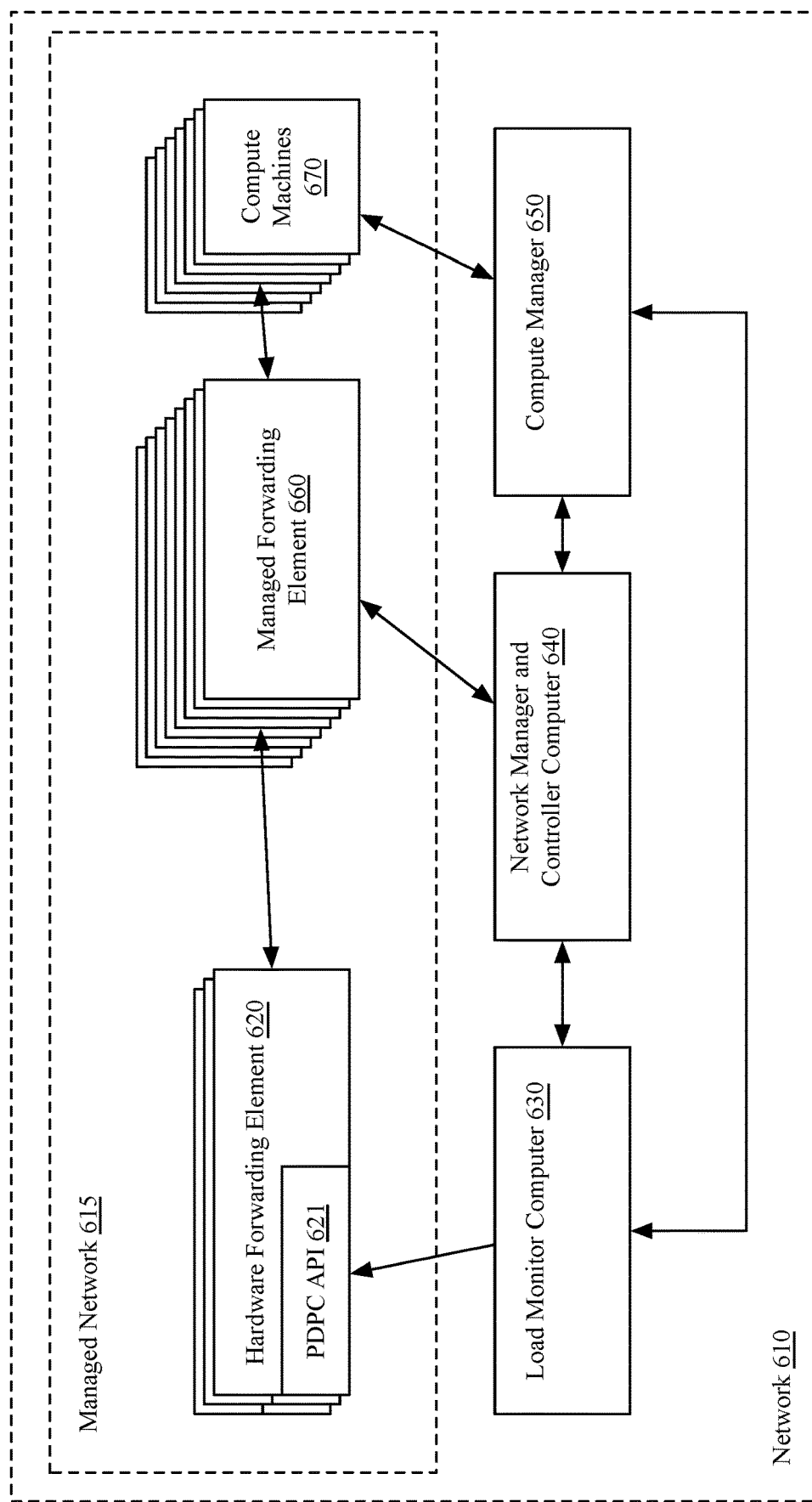
FIG. 6 illustrates a set of elements used in an embodiment in which a dedicated load monitor computer is used to generate parameter sets and provide parameter sets to a set of hardware forwarding elements through an API.

FIG. 6 illustrates a set of elements used in some embodiments in which a dedicated load monitor computer 630 is used to generate parameter sets and provide parameter sets to a set of hardware forwarding elements 620 through an API 621. FIG. 6 illustrates a network 610 that includes a managed network 615 and a load monitor computer 630, a network manager and controller computer 640 (e.g., an NSX Manager), and a compute manager 650 (e.g., vCenter). The managed network 615, in the illustrated embodiment, includes the set of hardware forwarding elements 620 (each having a programmable data plane circuit (PDPC) (not shown) and a PDPC API 620 for providing parameter sets to the PDPC), a set of other managed forwarding elements (MFEs) 660, and a set of compute machines 670 that are potential sources and destinations of packet flows. The MFEs 660, in some embodiments, include any, or all, of: virtual forwarding elements executing on host computers, software forwarding elements executing on bare metal, containers, or hardware forwarding elements. Similarly, the compute machines 670, in some embodiments, include any, or all, of: virtual machines, containers, servers, or any other destination for packet flows in a datacenter. As will be understood by one of ordinary skill in the art, the examples above are illustrative of the types of forwarding elements and compute machines in a managed network environment and are not meant to be exhaustive.

For the purposes of FIG. 6, a simplified view of the managed network 615 is provided that does not show host computers hosting the different forwarding elements 660 and the compute machines 670. The view of the managed network 615 merely illustrates that the set of hardware forwarding elements 620 are connected to the set of MFEs 660 which are in turn connected to the set of compute machines 670. In some embodiments, there are additional connections (not shown) between the set of hardware forwarding elements 620 and the compute machines 670 and an external network (not shown). Additionally, the network topology of individual connections between the different forwarding elements (620 and 660) and the compute machines 670 is ignored in FIG. 6 to highlight the use of a dedicated load monitor computer 630.

FIG. 6 also includes a load monitor computer 630, a network manager and controller computer 640 (e.g., an NSX Manager), and a compute manager 650 (e.g., vCenter). In the embodiments shown in FIG. 6, the network manager and controller computer 640 and compute manager 650 monitor and manage the elements of the managed network 615 and maintain usage data (and data regarding upcoming network events) regarding the forwarding elements 660 (and a set of host computers on which a subset of the forwarding elements 660 execute). In some embodiments, the monitoring and management is performed to implement a logical network (e.g., a logical overlay network) in a datacenter that includes the managed network 615. The load monitor computer 630, in some embodiments queries the network manager and controller computer 640 and the compute manager 650 for usage data at regular intervals (e.g., every 10 seconds) and generates parameter sets based on the retrieved usage data. In other embodiments, the network controller 640 and the compute manager 650 are configured to send usage data to the load monitor computer 630 upon the occurrence of certain events (e.g., spinning up a new forwarding element, scheduling an upgrade or a migration of a forwarding element, etc.) and additionally, or alternatively, at periodic intervals (e.g., every 10 seconds or 1 minute).

The load monitor computer 630, in some embodiments, performs a process (e.g., process 100) to collect the usage data (from the network manager and controller computer 640 and the compute manager 650), generate parameter sets, generate a set of instructions for the PDPC of the hardware forwarding element 620, and to provide the parameter sets to the PDPC through the PDPC API 621. In some embodiments, the PDPC API 621 is a P4 plug-in that executes on the hardware forwarding element 620. One of ordinary skill in the art will understand that there are additional methods of providing the parameter sets to the PDPCs of the hardware forwarding elements 620. While the system shown FIG. 6 is illustrated in FIG. 5, one of ordinary skill in the art will appreciate that this system is equally applicable to the examples shown in FIGS. 3A-B just as the collector/controller system of FIGS. 3A-B is applicable to the example of FIG. 5.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
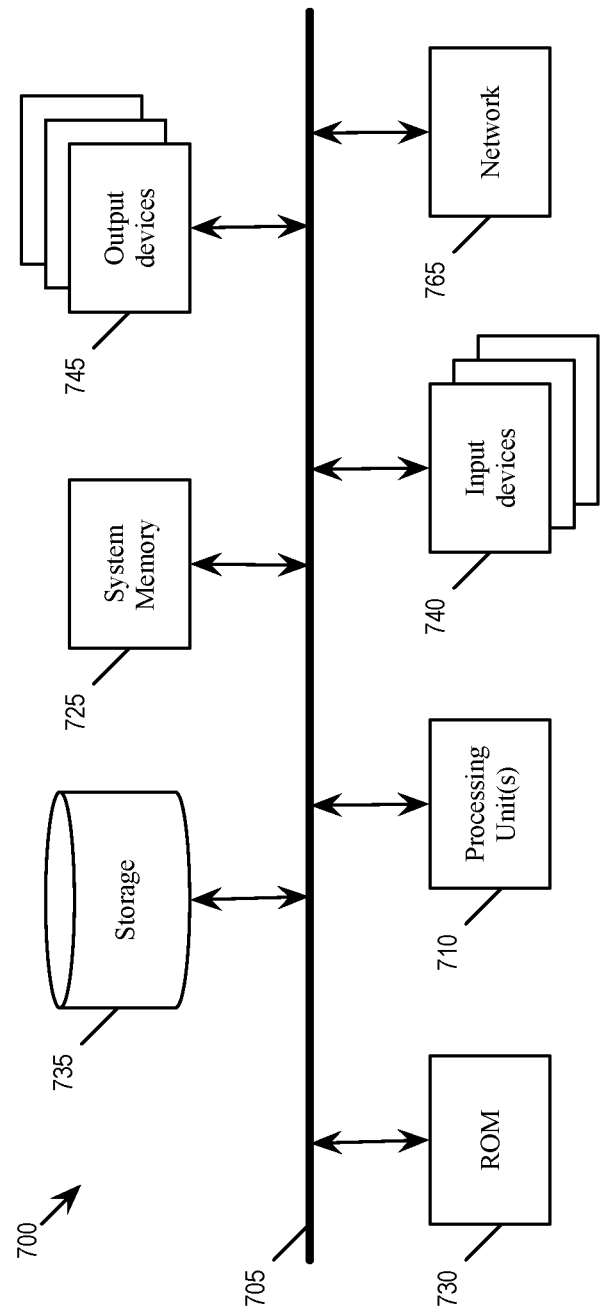
FIG. 7 conceptually illustrates a computer system with which some embodiments of the invention are implemented.

FIG. 7 conceptually illustrates a computer system 700 with which some embodiments of the invention are implemented. The computer system 700 can be used to implement any of the above-described hosts, controllers, and managers. As such, it can be used to execute any of the above described processes. This computer system includes various types of non-transitory machine readable media and interfaces for various other types of machine readable media. Computer system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the computer system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments. The read-only-memory (ROM) 730 stores static data and instructions that are needed by the processing unit(s) 710 and other modules of the computer system. The permanent storage device 735, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such a random access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the computer system. The input devices 740 include alphanumeric keyboards and pointing devices (also called "cursor control devices"). The output devices 745 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples computer system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of computer system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method of configuring a hardware forwarding element to distribute packet flows between a set of two or more managed forwarding elements, the method comprising:
at a computer:
receiving metrics regarding operation of each managed forwarding element;
identifying, from the received metrics, operating conditions of the managed forwarding elements;
based on the identified operating conditions, computing a set of weight values to distribute to the hardware forwarding element; and
using an application programming interface (API) command of a programmable data plane circuit of the hardware forwarding element to provide the computed set of weight values to the hardware forwarding element to use to adjust how the hardware forwarding element distributes packet flows between the managed forwarding elements.

2. The method of claim 1, wherein the managed forwarding elements are gateway forwarding elements of a network.

3. The method of claim 2, wherein the network is a logical network and the managed forwarding elements are part of the logical network, while the hardware forwarding element is not part of the logical network.

4. The method of claim 2, wherein the packet flows distributed by hardware forwarding element traverse different paths to a common destination machine in the network and the weight values allows the hardware forwarding element to select between the different paths.

5. The method of claim 1, wherein
each managed forwarding element in at least a subset of the managed forwarding elements is a software forwarding element that executes on a host computer along with compute machines,
the compute machines use resources shared by the managed forwarding elements in the subset, and
the received metrics are associated with congestion values that are at least partially based on the use of resources by the compute machines.

6. The method of claim 1, wherein
each managed forwarding element in at least a subset of the managed forwarding elements is a software forwarding element that executes on a host computer comprising a network interface controller (NIC),
the received metrics comprises a set of statistics related to at least one of managed forwarding element characteristics, network interface controller (NIC) characteristics, and characteristics of each host computer that executes a managed element.

7. The method of claim 6, wherein the managed forwarding element characteristics comprise at least one of a number of virtual central processing units (vCPUs) and a number of layer 2 hops between the programmable data plane circuit and the forwarding element.

8. The method of claim 6, wherein the NIC characteristics comprise at least one of a speed of the NIC and a utilization of the NIC.

9. The method of claim 6, wherein the host computer characteristics comprise at least one of a number of central processing unit (CPU) cores on the host computer, a speed of the CPUs of the host computer, a utilization of the CPUs of the host computer, and a memory utilization.

10. The method of claim 1, wherein the received metrics comprise data indicating congestion at at least one particular managed forwarding element and the computed set of weight values causes the hardware forwarding element to distribute fewer packet flows through the particular managed forwarding element in order to reduce the congestion at the particular managed forwarding element.

11. A non-transitory machine readable medium for execution by a set of processing units of a computer, the program for configuring a hardware forwarding element to distribute packet flows between a set of two or more managed forwarding elements, the program comprising a set of instructions for:
receiving metrics regarding operation of each managed forwarding element;
identifying, from the received metrics, operating conditions of the managed forwarding elements;
based on the identified operating conditions, computing a set of weight values to distribute to the hardware forwarding element; and
using an application programming interface (API) command of a programmable data plane circuit of the hardware forwarding element to provide the computed set of weight values to the hardware forwarding element to use to adjust how the hardware forwarding element distributes packet flows between the managed forwarding elements.

12. The non-transitory machine readable medium of claim 11, wherein the managed forwarding elements are gateway forwarding elements of a network.

13. The non-transitory machine readable medium of claim 12, wherein the network is a logical network and the managed forwarding elements are part of the logical network, while the hardware forwarding element is not part of the logical network.

14. The non-transitory machine readable medium of claim 12, wherein the packet flows distributed by hardware forwarding element traverse different paths to a common destination machine in the network and the weight values allows the hardware forwarding element to select between the different paths.

15. The non-transitory machine readable medium of claim 14, wherein the computation of weight values based on the collected metrics and the distribution of the weight values allow the hardware forwarding element to perform dynamic weighted path selection.

16. The non-transitory machine readable medium of claim 14, wherein
each managed forwarding element in at least a subset of the managed forwarding elements is a software forwarding element that executes on a host computer along with compute machines,
the compute machines use resources shared by the managed forwarding elements in the subset, and
the received metrics are associated with congestion values that are at least partially based on the use of resources by the compute machines.

17. The non-transitory machine readable medium of claim 11, wherein
each managed forwarding element in at least a subset of the managed forwarding elements is a software forwarding element that executes on a host computer comprising a network interface controller (NIC),
the received metrics comprises a set of statistics related to at least one of managed forwarding element characteristics, network interface controller (NIC) characteristics, and characteristics of each host computer that executes a managed element.

18. The non-transitory machine readable medium of claim 17, wherein the managed forwarding element characteristics comprise at least one of a number of virtual central processing units (vCPUs) and a number of layer 2 hops between the programmable data plane circuit and the forwarding element.

19. The non-transitory machine readable medium of claim 17, wherein
the NIC characteristics comprise at least one of a speed of the NIC and a utilization of the NIC; and
the host computer characteristics comprise at least one of a number of central processing unit (CPU) cores on the host computer, a speed of the CPUs of the host computer, a utilization of the CPUs of the host computer, and a memory utilization.

20. The non-transitory machine readable medium of claim 11, wherein weight values configure the hardware forwarding element to use two different ports that connect to at least two different paths to a common destination machine.

* * * * *